(12) United States Patent
Yang

(10) Patent No.: US 7,555,169 B2
(45) Date of Patent: Jun. 30, 2009

(54) METHOD AND A DEVICE FOR REDUCING IMAGE NOISES

(75) Inventor: Keven Yang, Taipei County (TW)

(73) Assignee: Lite-On Technology Corporation, Taipei (TW)

(*) Notice: Subject to any disclaimer, the term of this patent is extended or adjusted under 35 U.S.C. 154(b) by 682 days.

(21) Appl. No.: 11/362,478

(22) Filed: Feb. 23, 2006

(65) Prior Publication Data

US 2006/0262993 A1 Nov. 23, 2006

(30) Foreign Application Priority Data

May 18, 2005 (CN) .................. 2005 1 0072967

(51) Int. Cl.
*G06K 9/40* (2006.01)

(52) U.S. Cl. .................. 382/254; 342/196; 386/76; 386/114; 386/E5.04

(58) Field of Classification Search .............. 342/196; 382/254; 386/76, 114, E5.04; 708/403, 404

See application file for complete search history.

(56) References Cited

U.S. PATENT DOCUMENTS

2006/0222192 A1* 10/2006 Matthey ............... 381/312
2007/0242884 A1* 10/2007 Dugan et al. .......... 382/190

* cited by examiner

*Primary Examiner*—Matthew C Bella
*Assistant Examiner*—Gregory F Cunningham
(74) *Attorney, Agent, or Firm*—Quintero Law Office

(57) ABSTRACT

An image noise reduction method in frequency domain is provided, comprising selecting a first image and applying a Fourier transform thereon to acquire a first frequency spectrum, wherein each pixel of the first frequency spectrum has a real part X and a imaginary part Y, calculating a first energy of each pixel and a first mean energy of all first energies of the pixels, calculating a first mean value and a first standard deviation of the real part of the pixels, calculating a second mean value and a second standard deviation of the imaginary part of the pixels, determining a first and a second predetermined values, when the first energy exceeds the first mean energy, the first and second predetermined value are replaced with X and Y, and when the first energy does not exceed the first mean energy, X and the Y are reserved.

15 Claims, 4 Drawing Sheets

METHOD AND A DEVICE FOR REDUCING IMAGE NOISES

BACKGROUND OF THE INVENTION

1. Field of the Invention

The invention relates to a image noise reduction, and in particular to a method and a device for reducing image noise in frequency domain.

2. Description of the Related Art

Most image processing methods experience interference for image noise generated during transmission with resulting decrease in image quality. In a conventional method for reducing image noise, a Gaussian filter is applied. The Gaussian filter, an image processor in spatial domain, smoothes the image by calculating a pixel weighted average value for each pixel based on surrounding pixels and replacing an original pixel value therewith. The Gaussian filter processes both image noise and correct pixel values, blurring. To improve the issue, the invention provides an image noise reduction method to reduce the energies of the image noises in the frequency domain.

BRIEF SUMMARY OF THE INVENTION

The invention provides a method for reducing image noise, comprising selecting a first image of $2^n \times 2^n$ pixels, wherein n is an positive integer value; transforming the first image to a first frequency spectrum by a Fourier transform, wherein each pixel of the first frequency spectrum has a real part X and an imaginary part Y, calculating a first energy of each pixel of the first frequency spectrum and a first mean energy of all pixels of the first frequency spectrum; calculating a first mean value and a first standard deviation of the real part of the pixels of the first frequency spectrum, calculating a second mean value and a second standard deviation of the imaginary part of the pixels of the first frequency spectrum, determining a first predetermined value and a second predetermined value, executing a noise elimination procedure, wherein when the first energy of the pixel exceeds the first mean energy, the first predetermined value is replaced with the real part X of the pixel and the second predetermined value is replaced with the imaginary part Y of the pixel; when the first energy of the pixel does not exceed than the first mean energy, the real part X and the imaginary part Y of the pixel are reserved.

In an embodiment of the method, the first energy is calculated by the formula: $\log_{10}(1+\sqrt{X^2+Y^2})*(2^{n+1}-1)/\log_2$, wherein $\log_2 = \log_{10}(255 \times 128 \times 128)$.

An embodiment of the method further comprises generating a second frequency spectrum according to the noise elimination procedure, and applying an inverse Fourier transform on the second frequency spectrum.

The invention further provides a device for reducing image noise, comprising a Fourier transform unit and a image processor. The Fourier transform unit receives and transforms a first image of $2^n \times 2^n$ pixels into a first frequency spectrum, wherein each pixel of the first frequency spectrum has a real part X and an imaginary part Y. The image processor receives the first frequency spectrum and applies a image noise reduction on the first frequency spectrum, comprising calculating a first energy of each pixel of the first frequency spectrum and a first mean energy of all pixels of the first frequency spectrum, calculating a first mean value and a first standard deviation of the real part of the pixels of the first frequency spectrum, calculating a second mean value and a second standard deviation of the imaginary part of the pixels of the first frequency spectrum, determining a first predetermined value and a second predetermined value, when the first energy of the pixel exceeds the first mean energy, the first predetermined value is replaced with the real part X of the pixel and the second predetermined value is replaced with the imaginary part Y of the pixel, when the first energy of the pixel does not exceed the first mean energy, the real part X and the imaginary part of the pixel are reserved.

In an embodiment of the device, the first energy is calculated by the following formula: $\log_{10}(1+\sqrt{X^2+Y^2})*(2^{n+1}-1)/\log_2$, and wherein $\log_2 = \log_{10}(255 \times 128 \times 128)$.

An embodiment of the device further comprises an inverse Fourier transform unit applying an inverse Fourier transform on a second frequency spectrum wherein the second frequency spectrum is generated by the image noise reduction procedure.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
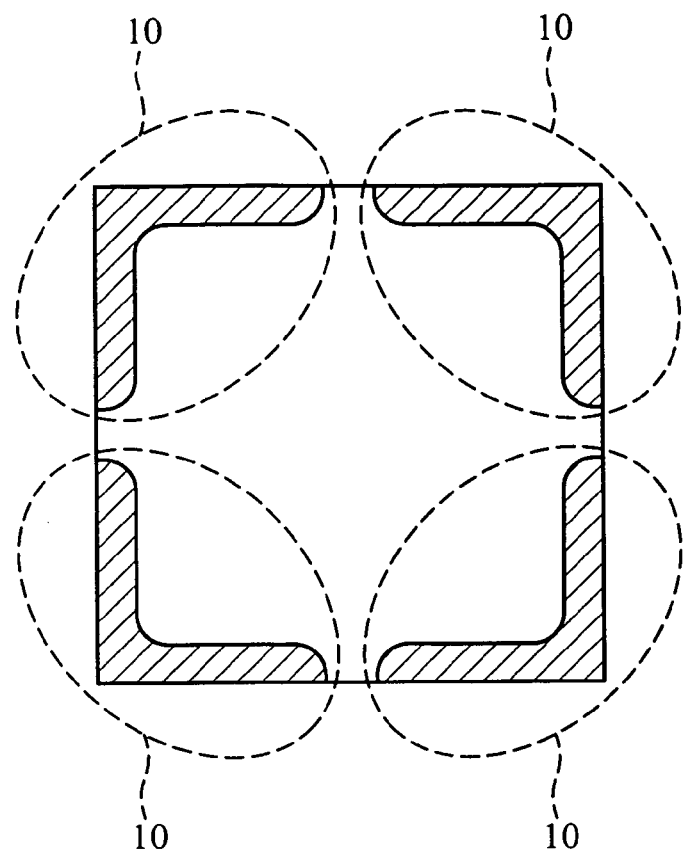
FIG. 1a is an energy distribution diagram of an image without image noise in frequency domain.
Figure 1B:
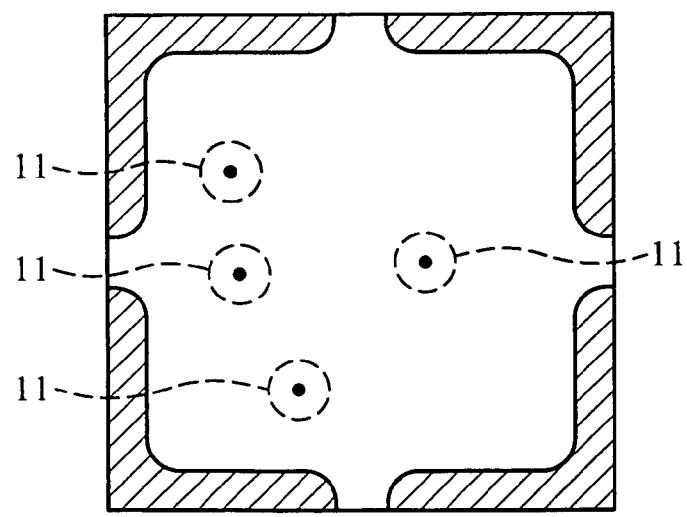
FIG. 1b is an energy distribution diagram of an image with image noise in frequency domain.
Figure 2:
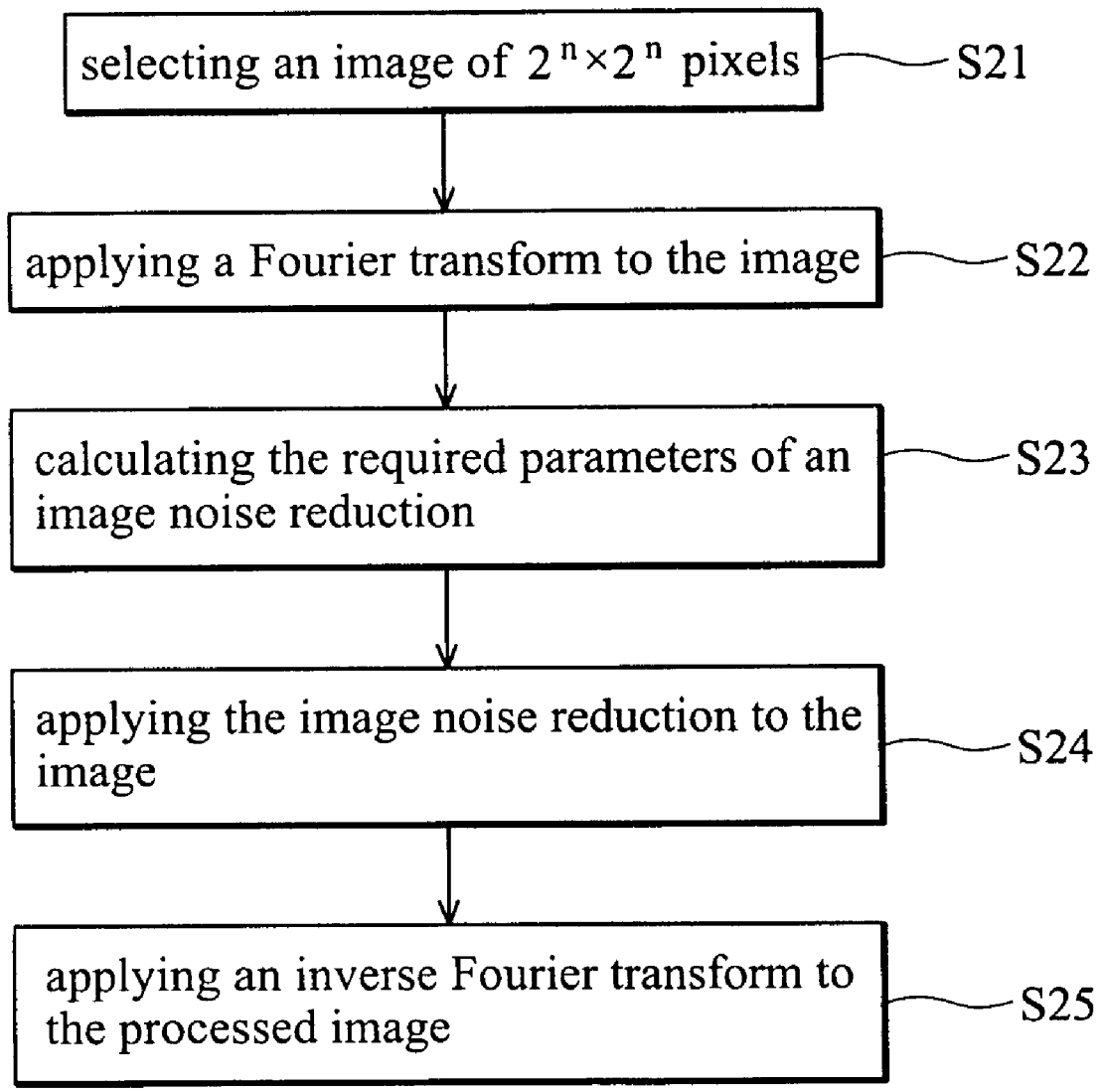
FIG. 2 is a flowchart of one embodiment of an image noise reduction procedure of the invention.

FIG. 1a is an energy distribution diagram of an image without image noise in frequency domain, in which when transformed into frequency domain from spatial domain, the high energy lies mainly in the corner of the image as shown by the dotted frame 10 of FIG. 1. FIG. 1b is an energy distribution diagram of an image with image noise in frequency domain. Compared with FIG. 1a, the high energy appears areas other than the corner of the image, caused by image noise, as shown by the dotted frame 11 of FIG. 1b.

The invention provides a method for reducing image noise shown in FIG. 1b. First, an image is divided into a plurality of first images of $2^n \times 2^n$ pixels (step S21), wherein n is a positive integer value. For example, if an image is 360 dpi×480 dpi and is to be divided into a plurality of first images of 256 dpi×256 dpi, first, a random first image of 256 dpi×256 dpi is selected, and shifted one or more of pixels vertically or horizontally to select another first image of 256 dpi×256 dpi until all pixels of the image have been selected. In step S22, a Fourier transform is applied on each first image to acquire a first frequency spectrum. After Fourier transform, each pixel of the first frequency spectrum has a real part X and an imaginary part Y, and a plurality of parameters are calculated accordingly, wherein $X_{avg}$ is the average of all real parts X of all pixels, Xs is a standard deviation of all real parts X of all pixels, $Y_{avg}$ is the average of all imaginary parts Y of all pixel, Ys is a standard deviation of all imaginary parts Y of all pixels, a first predetermined value X1 calculated by the formula $X1=X_{avg}+K\times Xs$, K is an integer, a second predetermined value Y1 calculated by the formula $Y1=Y_{avg}+L\times Ys$, L is an integer, E is the energy of the pixel and $E_{avg}$ is the average of energies E of all pixels (step S23).

After step S23, a comparison is applied. When the energy E of the selected pixel does not exceed the average energy $E_{avg}$, the real part X and the imaginary part Y of the selected pixel are reserved. When the energy E of the selected pixel exceed the average energy $E_{avg}$, it is determined whether the selected pixel is in a predetermined high energy area, wherein the predetermined high energy area is within m pixels of the boundary. When the selected pixel is within m pixels of the boundary, the real part X and the imaginary part Y of the selected pixel are reserved, wherein m is an integer. When the selected pixel is not within m pixels from the boundary, the real part X of the selected pixel is replaced with the first predetermined value X1, and the imaginary Y of the selected pixel is replaced with the second predetermined value Y1. After step S24, a second frequency spectrum is generated according to the comparison, and an inverse Fourier transform is applied to the second frequency spectrum to acquire a second image in step S25.

Figure 3:
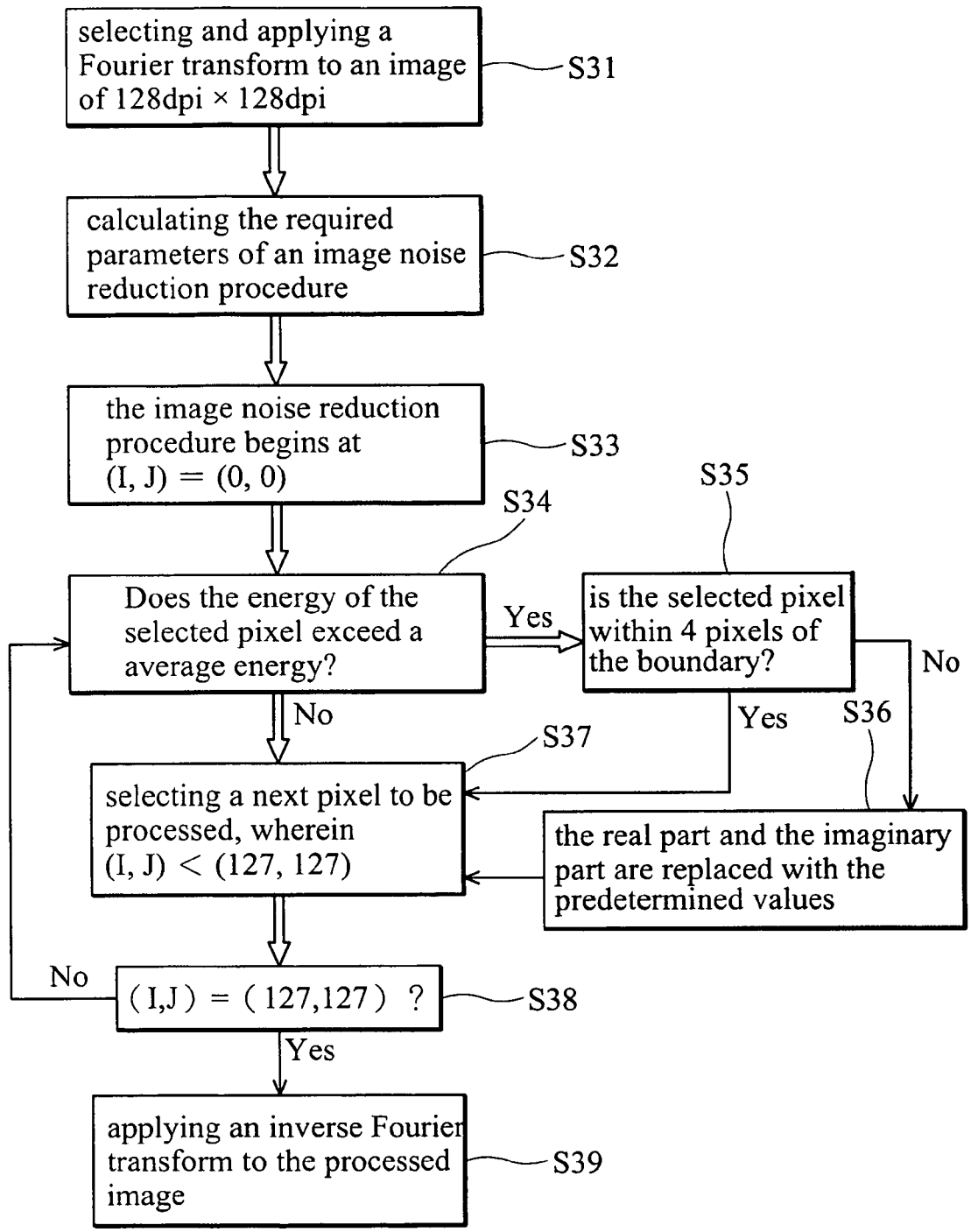
FIG. 3 is a flowchart of one embodiment of an image of size 128 dpi×128 dpi applied on an image noise reduction procedure of the invention.

FIG. 3 is a flowchart of one embodiment of an image of 128 dpi×128 dpi subject to an image noise reduction procedure of the invention. In step S31, a Fourier transform is applied to the image to acquire a first frequency spectrum, wherein each pixel of the first frequency spectrum has a real part X and an imaginary part Y, wherein X and Y are mapped to an integer between 0 and 255. In steps S32, a plurality of parameters are calculated according to the X and Y, wherein $X_{avg}$ is the average of all real parts X of all pixels, Xs is a standard deviation of all real parts X of all pixels, $Y_{avg}$ is the average of all imaginary parts Y of all pixels, Ys is a standard deviation of all imaginary parts Y of all pixels, a first predetermined value X1 calculated by the formula $X1=X_{avg}+K\times Xs$, K is an integer, a second predetermined value Y1 calculated by the formula $Y1=Y_{avg}+L\times Ys$, L is an integer number, E is the energy of pixel and $E_{avg}$ is the average of energies E of all pixels. In the embodiment, the energy E is calculated by the formula $\log_{10}(1+\sqrt{X^2+Y^2})*(2^{n+1}-1)/\log_2$, wherein $\log_2=\log_{10}(255\times 128\times 128)$.

In step S33, each pixel of the first frequency spectrum is indicated by a coordinate value (I, J), wherein I is an X coordinate and J is a Y coordinate. The image noise reduction procedure begins at (0, 0). In step S34, the energy of the pixel (0, 0) is compared with the average energy $E_{avg}$, and when the energy of the pixel (0, 0) exceeds, step S35 is executed, and if not, step S37 is executed.

In step S35, it is determined whether the selected pixel is in a predetermined high energy area, such as the dotted frame 10 of FIG. 1a. In the embodiment, the high energy area is the area within 4 pixels of the boundary. When the selected pixel is at the high energy area, the real part X and the imaginary Y of the selected pixel are reserved, step S37 is executed. When the selected pixel is not in the high energy area, step S36 is executed. Since the selected pixel is not in the high energy area, the selected pixel is regarded as noise, thus, the real part X and the imaginary Y of the selected pixel is respectively replaced with X1 and Y1.

In step 37, the image noise reduction procedure selects a next pixel to process. In the embodiment, the image noise reduction procedure fixes the coordinate value J and increases the coordinate value I, such as (0, 0), (1, 0), (2, 0) ... (127, 0), and the coordinate value J is increase by 1, increasing the coordinate value I, such as (0, 1), (1, 1), (2, 1) ... (127, 1) and so forth. In step S38, it is determined whether the coordinate value (I, J) is (127, 127). If not, step S34 is executed. If the coordinate value (I, J) is (127, 127), an inverse Fourier transform is applied to the result of the image noise reduction procedure to acquire a processed image with most image noises reduced.

In step S38, the pixel (127, 127) is at the high energy of the invention, thus the real part and the imaginary part of the pixel (127, 127) of the first frequency spectrum are reserved in respective of whether the energy exceeds the average energy $E_{avg}$. The embodiment is only an example of the invention, and is not intended to limit the invention.

Figure 4:
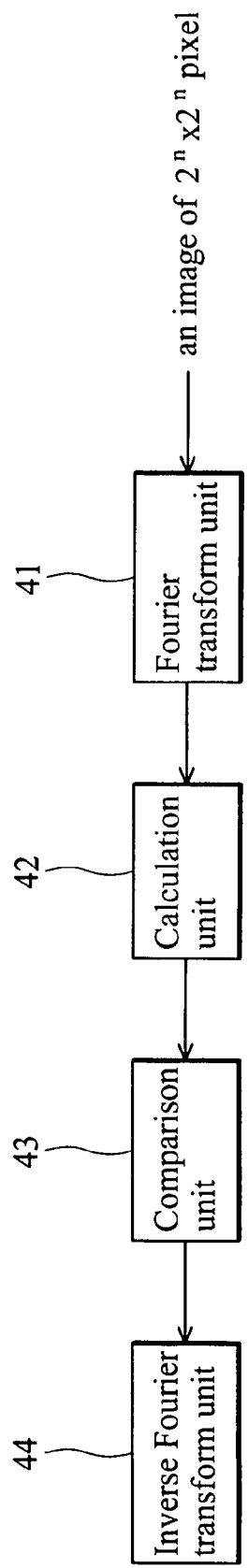
FIG. 4 is a schematic diagram of an image noise reduction device of the invention.

FIG. 4 is a schematic diagram of an image noise reduction device of the invention. Fourier transform unit 41 receives and transforms a first image of $2^n\times 2^n$ pixels into a first frequency spectrum, wherein each pixel of the frequency spectrum has a real part X and an imaginary part Y. The calculation unit 42 calculates a plurality of parameters according to the real part and imaginary part, wherein $X_{avg}$ is the average of all real parts X of all pixels, Xs is a standard deviation of all real parts X of all pixels, $Y_{avg}$ is the average of all imaginary parts Y of all pixel, Ys is a standard deviation of all imaginary parts Y of all pixels, a first predetermined value X1 calculated by the formula $X1=X_{avg}+K\times Xs$, K is an integer, a second predetermined value Y1 calculated by the formula $Y1=Y_{avg}+L\times Ys$, L is an integer, E is the energy of pixel and $E_{avg}$ is the average of energies E of all pixels. The comparator 43 compares the energy of each pixel with the average energy $E_{avg}$. When the energy of the pixel exceeds the average energy $E_{avg}$ and the pixel is not in a high energy area, such as the dotted frame 10 of FIG. 1, the real part X and the imaginary part Y are replaced with X1 and Y1. When the energy of the pixel does not exceed the average energy $E_{avg}$ or the energy of the pixel exceeds the average energy $E_{avg}$ but the pixel is in a high energy area, the real part X and the imaginary part Y are reserved. The inverse Fourier transform unit 44 receives and applies an inverse Fourier transform on the result of the comparator 43 to acquire a processed image with most image noises reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing image noise, comprising:

selecting a first image of $2^n\times 2^n$ pixels, wherein n is a positive integer value;

transforming the first image into a first frequency spectrum by applying a Fourier transform, wherein each pixel of the first frequency spectrum has a real part X and a imaginary part Y;

calculating a first energy of each pixel of the first frequency spectrum and a first mean energy of all pixels of the first frequency spectrum;

calculating a first mean value and a first standard deviation of the real part of the pixels of the first frequency spectrum;

calculating a second mean value and a second standard deviation of the imaginary part of the pixels of the first frequency spectrum;

determining a first predetermined value and a second predetermined value; and executing a noise elimination procedure, wherein when the first energy of the pixel exceed the first mean energy, replacing the real part X of the pixel with the first predetermined value and replacing the imaginary part Y of the pixel with the second predetermined value;

when the first energy of the pixel does not exceed the first mean energy, the real part X and the imaginary part Y of the pixel are reserved.

2. The method as claimed in claim 1, wherein further comprising, when the pixel is within m pixels of the boundary of the first image, the real part X and the imaginary part Y of the pixel are reserved.

3. The method as claimed in claim 2, wherein m<n.

4. The method as claimed in claim 1, wherein the first predetermined value is the sum of the first mean value and K times the first standard deviation, and the second predetermined value is the sum of the second mean value and L times the second standard deviation.

5. The method as claimed in claim 4, wherein L is equal to K.

6. The method as claimed in claim 4, wherein the first energy is calculated by the formula:

$$\log_{10}(1+\sqrt{X^2+Y^2})*(2^{n+1}-1)/\log_2, \text{ wherein } \log_2=\log_{10}(255\times128\times128).$$

7. The method as claimed in claim 1, further comprising:

generating a second frequency spectrum according to the noise elimination procedure; and applying an inverse Fourier transform on the second frequency spectrum.

8. A device for reducing image noise, comprising:

a Fourier transform unit receiving and transforming a first image of $2^n \times 2^n$ pixels into a first frequency spectrum, wherein each pixel of the first frequency spectrum has a real part X and a imaginary part Y and n is a positive integer value;

an image processor receiving the first frequency spectrum and applying an image noise reduction on the first frequency spectrum:

calculating a first energy of each pixel of the first frequency spectrum and a first mean energy of all pixels of the first frequency spectrum;

calculating a first mean value and a first standard deviation of the real part of the pixels of the first frequency spectrum;

calculating a second mean value and a second standard deviation of the imaginary part of the pixels of the first frequency spectrum;

determining a first predetermined value and a second predetermined value; and when the first energy of the pixel exceeds the first mean energy, replacing the real part X of the pixel with the first predetermined value and replacing the imaginary part Y of the pixel with the second predetermined value;

when the first energy of the pixel does not exceed the first mean energy, the real part X and the imaginary part Y of the pixel are reserved.

9. The device as claimed in claim 8, wherein the image noise reduction procedure further comprises, generating a second frequency spectrum according to the noise elimination procedure.

10. The device as claimed in claim 8, wherein the image noise reduction procedure further comprises, when the pixel is within m pixels of the boundary of the first pixel, the real part X and the imaginary part Y of the pixel are reserved.

11. The device as claimed in claim 10, wherein m<n.

12. The device as claimed in claim 8, wherein the first predetermined value is the sum of the first mean value and K times the first standard deviation, and the second predetermined value is the sum of the second mean value and L times the second standard deviation.

13. The device as claimed in claim 12, wherein K is equal to L.

14. The device as claimed in claim 8, wherein the first energy is calculated by the formula:

$$\log_{10}(1+\sqrt{X^2+Y^2})*(2^{n+1}-1)/\log_2, \text{ wherein } \log_2=\log_{10}(255\times128\times128).$$

15. The device as claimed in claim 9, further comprising, an inverse Fourier transform unit applying an inverse Fourier transform on the second frequency spectrum.

* * * * *